US008910742B2

(12) United States Patent
Kikuta (10) Patent No.: US 8,910,742 B2
(45) Date of Patent: Dec. 16, 2014

(54) ELECTRIC POWER-STEERING APPARATUS (75) Inventor: Tomoyuki Kikuta, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/009,358

(22) PCT Filed: Jul. 20, 2012

(86) PCT No.: PCT/JP2012/068441
§ 371 (c)(1),
(2), (4) Date: Oct. 29, 2013

(87) PCT Pub. No.: WO2013/031419
PCT Pub. Date: Mar. 7, 2013

(65) Prior Publication Data
US 2014/0190760 A1   Jul. 10, 2014

(30) Foreign Application Priority Data

Aug. 26, 2011 (JP) ................................. 2011-184292
May 18, 2012 (JP) ................................. 2012-114586

(51) Int. Cl.
B62D 5/04 (2006.01)
(52) U.S. Cl.
CPC .................................. B62D 5/0406 (2013.01)
USPC ........................................ 180/444; 180/443
(58) Field of Classification Search
USPC ................................................ 180/443, 444
See application file for complete search history.

(56) References Cited

U.S. PATENT DOCUMENTS

| 7,810,607 B2 | 10/2010 | Ebuchi et al. |
| 2006/0108884 A1* | 5/2006 | Shiino et al. ..................... 310/89 |
| 2009/0120712 A1* | 5/2009 | Kashimoto et al. ........... 180/444 |
| 2010/0320026 A1* | 12/2010 | Yoshida et al. ............... 180/444 |
| 2011/0000737 A1* | 1/2011 | Nagase et al. ................ 180/444 |

FOREIGN PATENT DOCUMENTS

| JP | 09-020252 | | 1/1997 |
| JP | H0920252 A | * | 1/1997 |
| JP | 2007-276743 | | 10/2007 |
| JP | 2007276743 A | * | 10/2007 |
| JP | 2010100217 A | * | 5/2010 |
| JP | 2010-100217 | | 6/2010 |
| WO | WO 2007043283 A1 | * | 4/2007 ............... B62D 5/04 |

* cited by examiner

*Primary Examiner* — Joseph M Rocca
*Assistant Examiner* — Gabriela C Craciun
(74) *Attorney, Agent, or Firm* — Hartman Global IP Law; Gary M. Hartman; Domenica N. S. Hartman (57) ABSTRACT

Structure of an electric power-steering apparatus is achieved that is capable of both preventing damage to a connector 18a that is used for supplying electric power to an electric component, and improving the workability of the work for connecting the connector 18a. The connector 18a is located in a portion that is located below a housing 10a, and is located on the rear side of a worm wheel housing section 48a and below a torque sensor housing section 49a. Moreover, a protective wall section 21 is formed on the bottom surface of the worm wheel housing section 48a and extends downward, and when it is presumed that the electric power-steering apparatus is placed on a flat plane α, the edge on the bottom end of the protective wall section 21 and the bottom end sections of the support bracket 23 come in contact with the flat plant α such that a gap 52 is formed between the flat plane α and the connector 18a.

4 Claims, 11 Drawing Sheets

ELECTRIC POWER-STEERING APPARATUS

This application claims the benefit of International Application No. PCT/JP2012/068441 filed Jul. 20,2012, having a claim of priority to JP patent application No. 2011-184292, filed Aug. 26,2011, and JP patent application No. 2012-114586, filed May 18, 2012.

TECHNICAL FIELD

The present invention relates to a steering apparatus for an automobile, and more particularly to an electric power-steering apparatus that uses an electric motor as an auxiliary power source, and is able to reduce the force necessary for operating a steering wheel.

BACKGROUND ART

Figure 10:
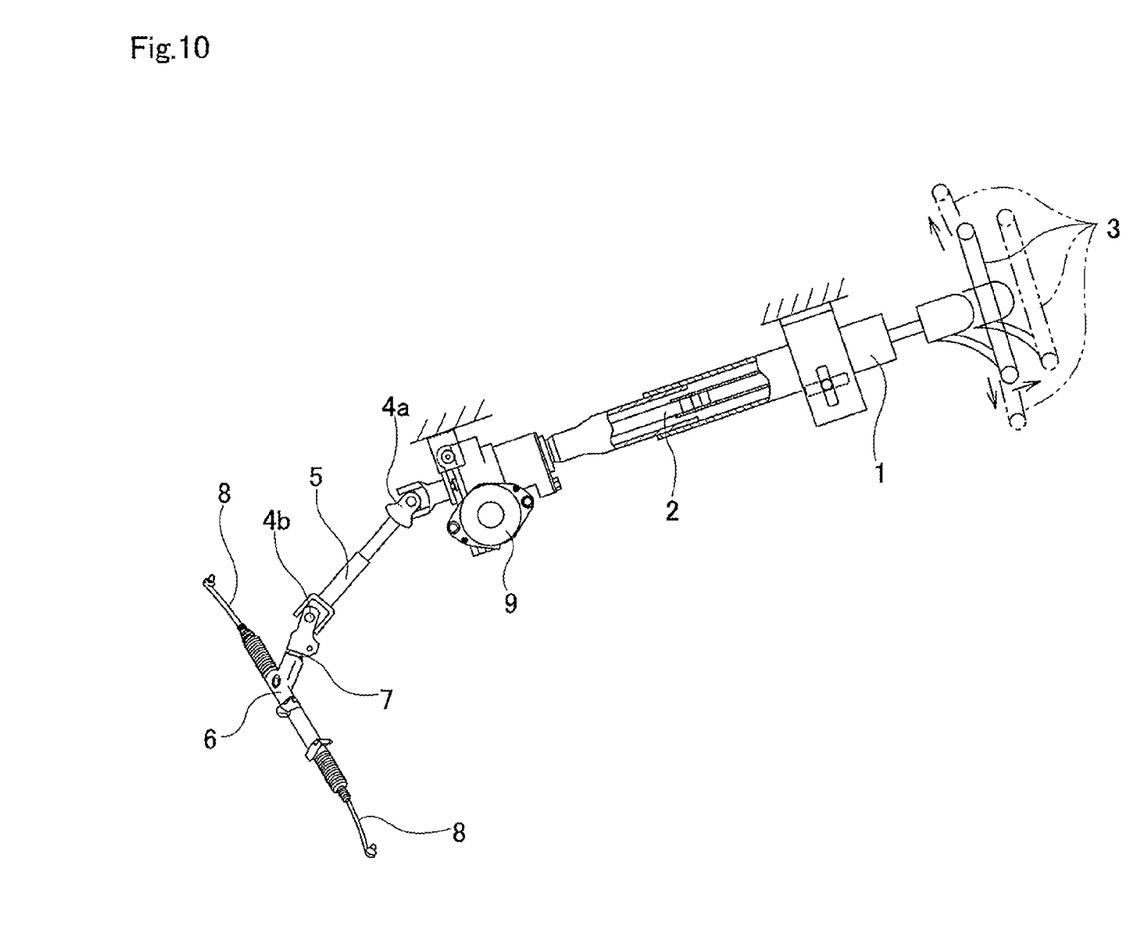
FIG. 10 is a partial cross-sectional view that illustrates an example of a conventional electric power-steering apparatus.

The use of electric power-steering apparatuses is widely spread as a steering apparatus for applying a steering angle to the steered wheels of an automobile, and that uses an electric motor as a drive source to reduce the steering force. FIG. 10 illustrates an example of a conventional electric power-steering apparatus. The directions in the following explanation are all directions when the steering apparatus is assembled in a vehicle.

In the case of the structure illustrated in FIG. 10, a steering shaft 2 is supported by way of a rolling bearing (not illustrated in the figure) on the inside of a cylindrical steering column 1 that is supported by the vehicle body so as to be able to freely rotate. A steering wheel 3 is fastened to the portion on the rear end section of the steering shaft 2 that protrudes from the opening section on the rear end of the steering column 1. The portion on the front end section of the steering shaft 2 that protrudes from the opening on the front end of the steering column 1 is connected to the rear end section of the intermediate shaft 5 by way of a universal joint 4a. Furthermore, the front end section of the intermediate shaft 5 is connected to the input shaft (pinion shaft) 7 of the steering gear unit 6 by way of another universal joint 4b.

As the steering wheel 3 rotates, this rotation is transmitted to the input shaft 7 by way of these members, and pushes and pulls a pair of left and right tie rods 8 by way of the steering gear unit 6, which applies a steering angle to a pair of left and right steered wheels according to the operation amount (steering angle) of the steering wheel 3. Particularly, in the case of the first example of conventional structure, by applying auxiliary power to the steering shaft 2 by an electric motor 9 that is supported on the front end section of the steering column 1, the force necessary for turning the steering wheel 3 is reduced.

Figure 11:
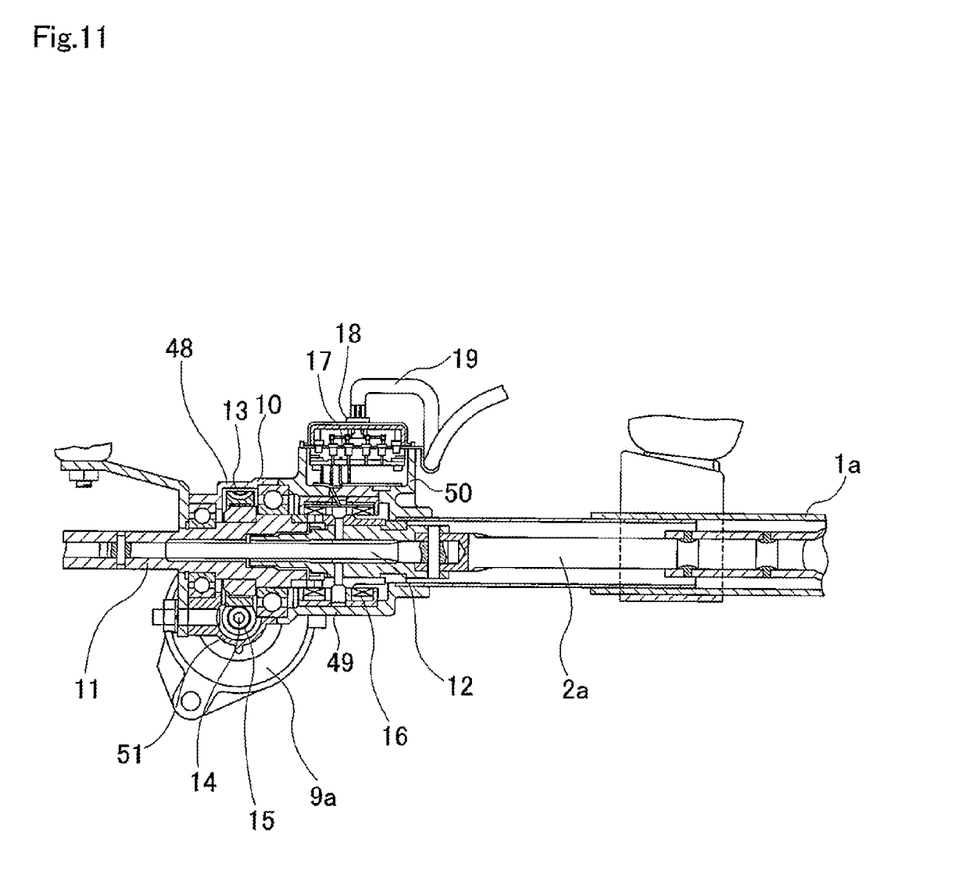
FIG. 11 is a partial cross-sectional view that illustrates an example of the main parts of a conventional electric power-steering apparatus.

FIG. 11 illustrates an example of specific structure of the major parts of an electric power-steering apparatus that is disclosed in JP 9-20252 (A). In the case of this structure, in order for the electric motor 9a to apply an auxiliary force to the steering shaft 2a, a cylindrical transmission shaft 11 is supported inside a housing 10 that is fastened to the front end section of the steering column 1a so as to be able to rotate, and the rear end section of this transmission shaft 11 and the front end section of the steering shaft 2a are connected by way of a torsion bar 12 so as to be able to transmit torque. Moreover, a worm wheel 13 that is fastened to the outer circumferential surface of the middle section of the transmission shaft 11 is made to engage with a worm 15 that is fastened to the output shaft 14 of an electric motor 9a so as to be able to apply auxiliary power from the electric motor 9a to the transmission shaft 11. Furthermore, in order to measure the torque that is applied to the steering shaft 2a, a torque sensor 16 is arranged around the transmission shaft 11. A harness 19 is connected by way of a connector 18 to the circuit board 17 that is connected to this torque sensor 16, and measurement values that indicate the direction and size of the torque that are outputted from this torque sensor 16 are inputted to a controller (ECU) (not illustrated in the figure).

In the case of this structure, the housing 10 is composed of a worm wheel housing section 48, a torque sensor housing section 49, a circuit board housing section 50 and a worm housing section 51. The worm wheel housing section 48 is an approximate circular disk shape that is arranged so as to be concentric with the steering column 1a, and houses the worm wheel 13 on the inside thereof. The torque sensor housing section 49 is provided adjacent to the rear side of the worm wheel housing section 48, and having a smaller diameter than the worm wheel housing section 48, houses the torque sensor 16 on the inside thereof. The circuit board housing section 50 is provided above the torque sensor housing section 49, and houses the circuit board 17 on the inside thereof. Furthermore, the worm housing section 51 has an approximate cylindrical shape that is arranged in a twisted position with respect to the steering shaft 2a, and houses the worm 15 on the inside thereof. The connector 18 is located above the circuit board housing section 50. Moreover, the worm wheel housing section 48 and the torque sensor housing section 49 cover the worm wheel 13 and the torque sensor 16 with minimum volume. Therefore, the outer circumferential surfaces of both the worm wheel housing section 48 and the torque sensor housing section 49 are formed into a circular shape along the shape of the worm wheel 13 and the torque sensor 16.

In the case of this structure, it is possible to control the direction and amount of current flowing through the electric motor 9a (the drive state) based on measurement values from the torque sensor 16, so it is possible to adequately reduce the force necessary for turning the steering wheel 3 (see FIG. 10) that is fastened to the rear end section of the steering shaft 2a. However, before or after the electric power-steering apparatus is assembled in the vehicle, there is the possibility that the following problems may occur.

That is, in the case of this structure, when the electric power-steering apparatus is temporarily placed on the floor or the like before being assembled in the vehicle, there is a possibility that the connector 18 may come in contact with the floor together with the end section of the harness 19. This connector 18 is often made using synthetic resin or the like, so in the case that it comes in contact with the floor, there is a possibility that damage could occur such as part being scratched, or some of the internal wiring could be cut. A unit having this kind of damaged connector 18 must be discarded as a defective unit, so it causes an increase in cost.

Moreover, in the case of this structure, there is a possibility that other parts other than the connector 18 that is used in connecting to the circuit board 17 could be damaged when the electric power-steering apparatus is temporarily placed on the floor or the like. In order to maintain the reliability of electrical supply connectors for supplying electric power to the electric motor 9a for which larger drive electric power is needed compared with the other electric components, often large-capacity connectors are used. Such large connectors when simply placed near the worm wheel housing section 48, due to the shape of the outer circumferential surface of the worm wheel housing section 48 being a circular shape, part of these connectors protrudes from the worm wheel housing 48 and could be easily damaged.

In addition, after the electric power-steering apparatus has been assembled in the vehicle, the connector 18 is placed on the upward side of the housing 10 (top side in FIG. 11), and is arranged in a narrow empty space between the housing 10 and a member on the vehicle side such as a steering support. Furthermore, the work of connecting the harness 19 to the connector 18 is normally performed from the driver seat side, so for the worker performing this connection work, the connector 18 is hidden behind the housing 10. Therefore, performing the work of connecting the harness 19 to the connector 18 after the electric power-steering apparatus has been assembled in the vehicle is inferior in work characteristics, and it causes an increase in cost.

On the other hand, it is feasible to complete the connection work before the electric power-steering apparatus has been assembled in the vehicle. However, when one group of electrical components that are electrically connected by way of a connector is arranged on both the electric power-steering apparatus side and the vehicle side, in order to perform the connection work before assembly, the length of the harness that connects to the connector must be sufficiently longer than the originally required length. Therefore, together with causing costs and weight to increase, the harness gets in the way, and there is a possibility that the ease of performing the work of assembling the electric power-steering apparatus will decrease. Depending on the arrangement of the electrical components, there may be cases wherein performing the connection work in advance before assembling the apparatus in the vehicle could be difficult or disadvantageous.

RELATED LITERATURE

Patent Literature

[Patent Literature 1] JP 9-20252 (A)

SUMMARY OF THE INVENTION

Problem to be Solved by the Invention

Taking the situation above into consideration, the object of the present invention is to achieve structure of an electric power-steering apparatus that is capable of both preventing damage to connectors used for supplying power to electrical components, and to improve the ease of the work required for connecting connectors.

Means for Solving the Problems

The electric power-steering apparatus of the present invention is basically the same as a conventional electric power-steering apparatus, and comprises: a cylindrical steering column that is supported by a vehicle body; a steering shaft that is supported on the inside of the steering column so as to be able to rotate freely, and that is rotated by a steering wheel that is fastened to the rear end section thereof; an electrical component that is used for applying auxiliary power in the same direction as the force applied from the steering wheel to the steering shaft or to a member that displaces as the steering shaft rotates; a connector for supplying electric power to the electrical component; and a housing that is fastened to the front end section of the steering column and comprises; a worm wheel housing section that has an approximate circular disk shape, that is arranged so as to be concentric with the steering column, and that houses a worm wheel inside thereof; and a torque sensor housing section that is provided adjacent to the rear side of the worm wheel housing section, that has a smaller diameter than the worm wheel housing section and that houses a torque sensor inside thereof.

The electric power-steering apparatus of the present invention is characterized by the installation location of the connector. In other words, in the electric power-steering apparatus of the present invention, the connector is installed in a portion that is located below the steering column or the torque sensor housing section when assembled in the vehicle, and that is above and separated from a flat plane assuming that the electric power-steering apparatus is placed on the flat plane with a bottom surface of the steering column facing downward when assembled in the vehicle.

The electric component means a component that is used for applying auxiliary power to the steering shaft or a member that displaces as the steering shaft rotates, however, it is not limited to a component that directly applies auxiliary power, but also includes a component that is indirectly used for applying auxiliary power. More specifically, the electric component is exemplified by an electric motor, a controller (ECU), a torque sensor, a rotation speed sensor and the like. Moreover, the connector means a part that is used for supplying electric power to the electrical component or is electrically connecting the electrical component to the other electrical component with connected to a harness or the like, for supplying power, supplying signals, for grounding and the like, however the use and the shape are not limited.

Preferably, a protective section is provided on the bottom surface of the steering column or a bottom surface of the worm wheel housing section and extends downward when assembled in the vehicle, and assuming that the electric power-steering apparatus is placed on the flat plane, a bottom end section of the protective section comes in contact with the flat plane.

Preferably, the width dimension of the protective section (dimension in the left-right direction of the vehicle) is greater than the width dimension of the connector. Furthermore, preferably, the connector is supported by this protective section.

Preferably, the protective section has an approximate L-shaped cross section, and this protective section covers the side section and part or all of the bottom section of the connector.

Preferably, the connector is a power supply connector (single power supply connector) for supplying electric power to an electric motor of the electric component, or is a combined connector (intentionally integrated with another connector) that includes this power supply connector.

Effect of the Invention

With the present invention, an electric power-steering apparatus can be achieved that is capable of both preventing damage to the connector, and improving workability of the work for connecting the connector. In other words, when assembled in the vehicle, the connector is located in a portion below the steering column, or of the housing, in a portion that is located below the torque sensor housing section that has a smaller diameter than the worm wheel housing section and is adjacent to the rear side of this worm wheel housing section. Therefore, in case the bottom surface of the steering column when assembled in the vehicle faces downward (the side where the connector is located) and the electric power-steering apparatus is placed on a flat plane, as the connector is located in a portion above and separated from the flat plane, even when the electric power-steering apparatus is temporarily placed on a flat floor surface before being assembled in the vehicle, it is possible to effectively prevent the connector from coming in contact with the floor surface and being damaged. Moreover, when assembled in the vehicle, this connector is exposed to a relatively large space on the near side of the steering column or housing. Therefore, it become easier to perform the work of connecting a harness or the like to the connector, thus it is possible to improve the connection work. In this way, an electric power-steering apparatus provided that is capable of both preventing damage to the connector, and improving the workability of the work to connect this connector.

MODES FOR CARRYING OUT THE INVENTION

EXAMPLE 1

FIG. 1 to FIG. 5 illustrate a first example of an embodiment of the present invention. Feature of this example are, together with devising an installation position for installing a connector 18a used for providing power to a controller 20, providing a protective wall section 21 for protecting the connector 18a. The basic structure and function of the other parts are the same as in a conventional electric power-steering apparatus. Therefore, explanations of common parts are omitted or simplified, so that the explanation below centers on the features of this example.

In the case of the electric power-steering apparatus of this example, an electric motor (brushless motor) 9b is used as an auxiliary power source for reducing the force necessary for operating a steering wheel 3 (see FIG. 10). The electric motor 9b is supported on the top surface of a housing 10a that is fastened to the front end section of an inner column 40 of a steering column 1b in a state such that the output shaft is orthogonal with respect to the steering column 1b, and is supported in an upright position. The output torque (auxiliary power) of the electric motor 9b is applied to a steering shaft 2b by way of a worm reduction gear that is provided in the housing 10a and is composed of a worm 15a and a worm wheel 13a.

The housing 10a is made by casting an aluminum alloy for example, and comprises a worm wheel housing section 48a, a torque sensor housing 49a, a circuit board housing 50a and a worm housing section 51a. The worm wheel housing section 48a has an approximate circular disk shape, is arranged so as to be concentric with the steering column 1b, and houses a worm wheel 13a therein. The torque sensor housing 49a is provided so as to be adjacent to the rear side of the worm wheel housing section 48a, has a smaller diameter than the worm wheel housing section 48a, and houses a torque sensor 16a that comprises a pair of detection coils therein. The circuit board housing section 50a has a rectangular box shape, is provided below the torque sensor housing unit 49a, and houses a circuit board 17a that is connected to the torque sensor 16a. Furthermore, the worm housing section 51a has an approximate cylindrical shape, is arranged in a twisted position with respect to the steering column 1b (up-down direction in FIG. 1 to FIG. 3, and FIG. 5), and houses a worm 15a therein.

A case 22 having an approximate rectangular shape and made of synthetic resin or metal is located in the portion on the top surface of the housing 10a that is adjacent to the electric motor 9b, and this case 22 houses a controller (ECU) 20 for controlling the driving state of the electric motor 9b therein. The controller 20 and the electric motor 9b are connected by a motor harness 24, and the controller 20 and the circuit board 17a are connected by a sensor harness 25. The end sections (plugs) of the motor harness 24 and the sensor harness 25 are connected to the connectors (not illustrated in the figure) that are provided on the controller 20, electric motor 9b and circuit board 17a, however, instead of a combination of a plug and connector, they can be directly connected using solder or the like. Moreover, the controller 20 and the electric motor 9b can be directly connected by a plurality of terminal fittings (not illustrated in the figure) without using a motor harness 24.

In this example, electric power that is supplied to the controller 20, which is an electrical component, from a battery (not illustrated in the figure) that is located in the engine room or the like, passes through an inverter circuit of the controller 20 and then is supplied to the electric motor 9b. In order to supply electric power in this way, a power supply connector 26 is used for supplying power from the battery to the controller 20. In order to drive the electric motor 9b, in the case of a passenger car, a large current of about 50 A to 80 A is required compared with the other electrical components, so in order to prevent fire and degradation over time and maintain fire resistance, a relatively large connector is used as the power-supply connector 26. Furthermore, in this example, a single integrated connector (combined connector) 18a is used for the power-supply connector 26 and a signal connector 27 that is used for performing communication with the in-vehicle network such as CAN, however, the power-supply connector 26 and the signal connector 27, instead of being integrated, can be separately provided. When these connectors are separately provided in this way, it is possible to devise the installation location for only the power-supply connector 26 so as to easily be made large in order to maintain reliability. Moreover, in this example, except for the wiring, a large part of the connector 18a is made using synthetic resin. In this example, parts such as the controller 20 and the electric motor 9b to which power is supplied by way of the controller 20 correspond to electrical components that are used for applying auxiliary power, and the connector 18a corresponds to a connector used for supplying power to these electrical components.

Figure 1:
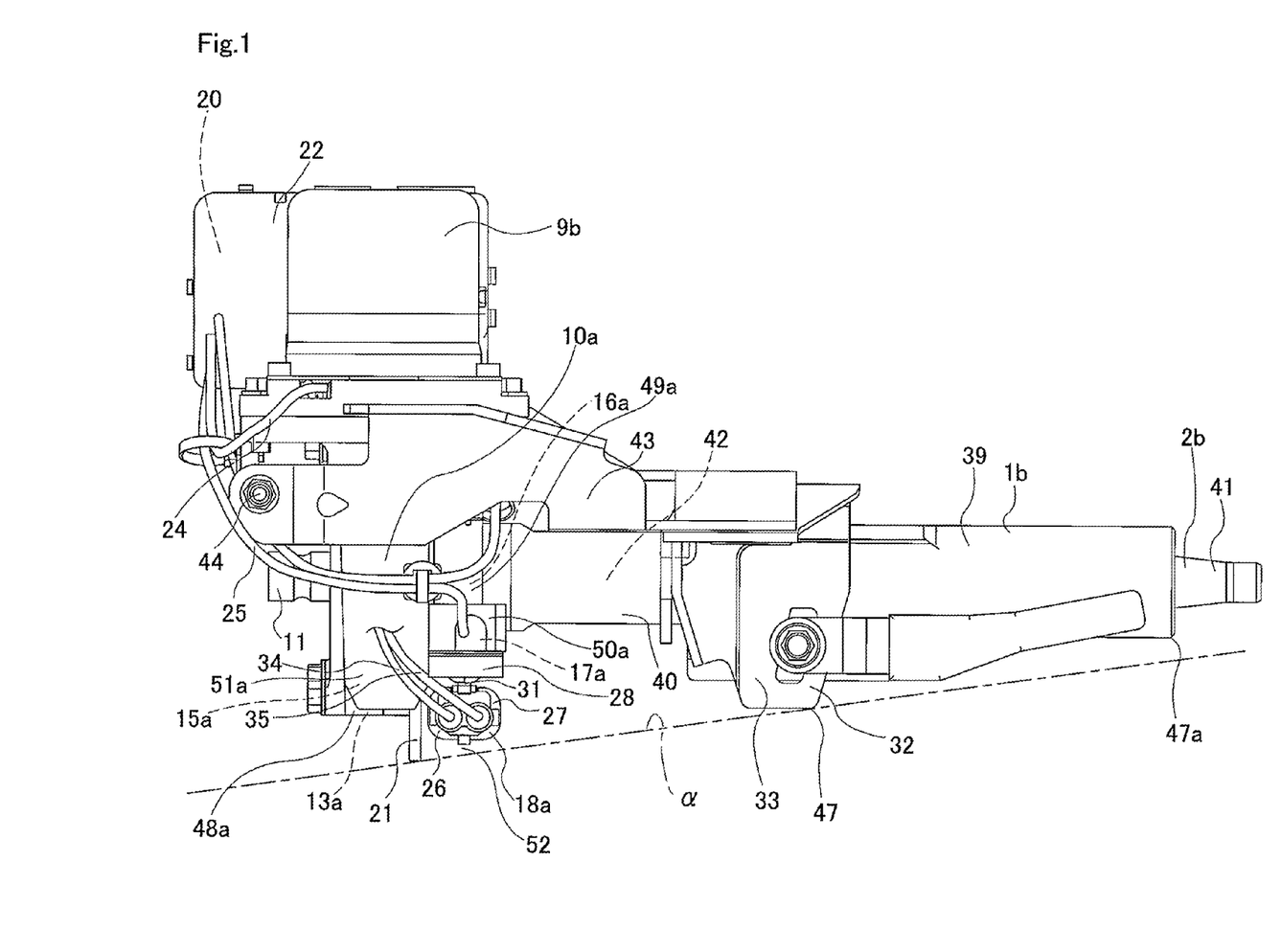
FIG. 1 is a side view illustrating an electric power-steering apparatus of a first example of an embodiment of the present invention.

Particularly, in the case of this example, the installation position of the connector 18a is devised. More specifically, the connector 18a is installed in a portion (space) that is located on the rear side of the bottom end section (end section on the outer diameter side) of the worm wheel housing section 48a and below the torque sensor housing section 29a of a space located below the housing 10a, when the electric power-steering apparatus is assembled in the vehicle (or when tilted in a horizontal state from the assembled state as illustrated in FIG. 1), and that is above and separated from a flat plane α, when the electric power-steering apparatus is placed on the flat plane α as indicated by the chain line in FIG. 1 with the bottom surface of the steering column facing downward as when assembled in the vehicle.

For this purpose, in this example, with arranged in a perpendicular direction (axial direction, front-back direction in FIG. 1 and FIG. 5, and left-right direction in FIG. 2 to FIG. 4) with respect to the center axis of the steering column 1b, the connector 18a is supported by and fastened to a cover 23 that covers the bottom surface of the circuit board housing section 50a by way of an installation plate 28. This installation plate 28 is composed of a pair of connecting sections 29 that are provided on both end sections in the width direction (left-right direction of the vehicle) and a support section 30 having an approximate U-shaped cross section that is provided between these connecting sections 29. In this example, the top surfaces of these connecting sections 29 are fastened to the bottom surface of the cover 23 by welding, screws, or some other fastening method. The connector 18a is supported by and fastened to the bottom surface of the support section 30 using a fastening member 31. In this state, part of this fastening member 31 is located in a space between the cover 23 and the support section 30. With this kind of structure, the connector 18a is located in the portion of the bottom side of the circuit board housing section 50a of the portion located below the torque sensor housing section 49a.

Figure 2:
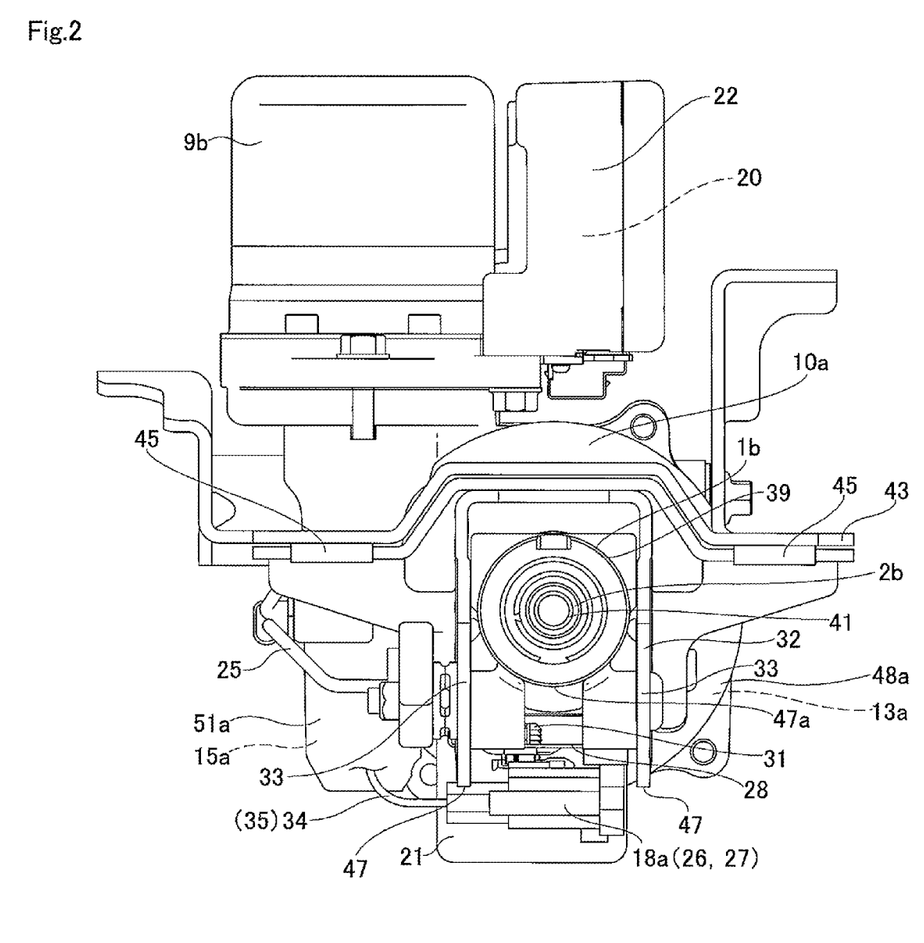
FIG. 2 is a drawing of the electric power-steering apparatus illustrated in FIG. 1, and illustrates the state as seen from the rear side of the vehicle.
Figure 3:
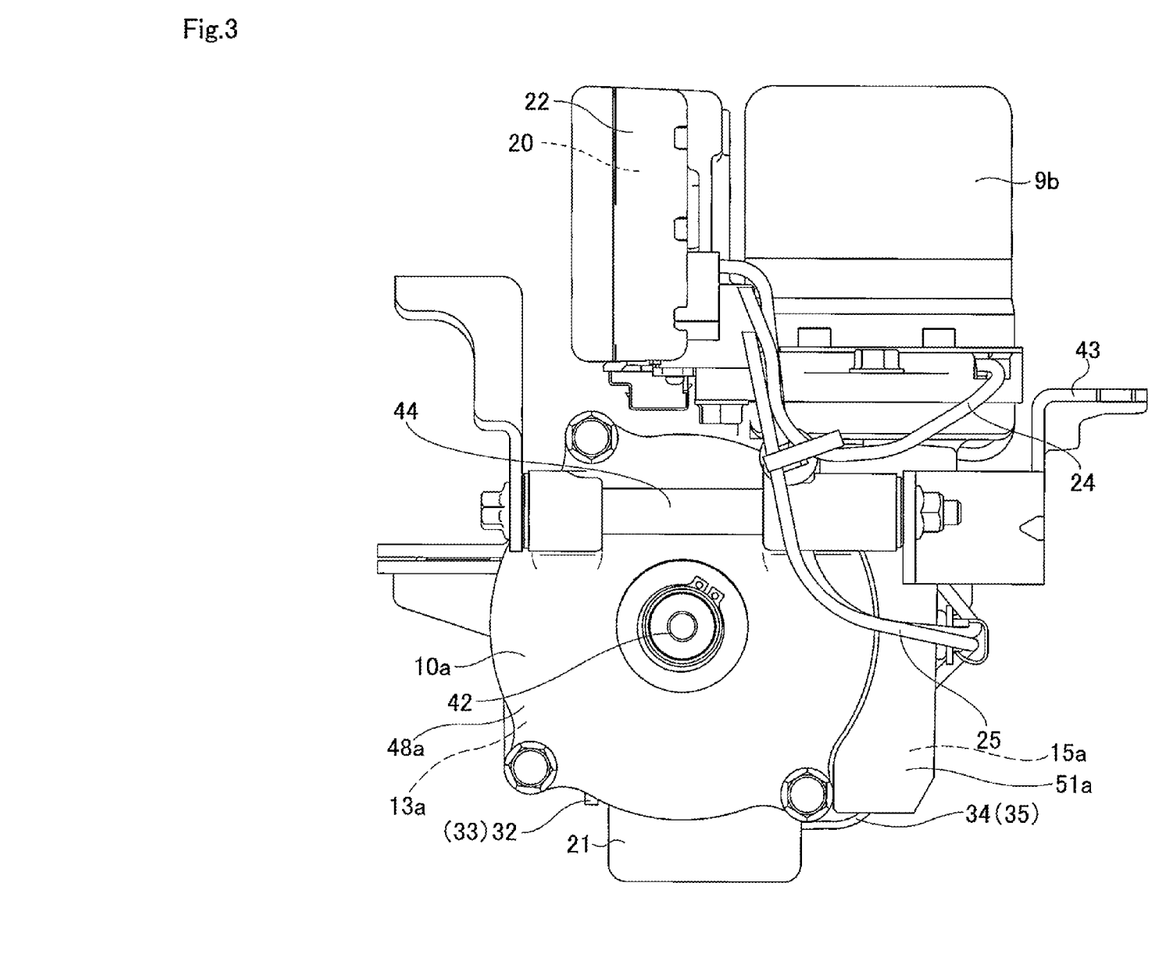
FIG. 3 is a drawing of the electric power-steering apparatus illustrated in FIG. 1, and illustrates the state as seen from the front side of the vehicle.
Figure 4:
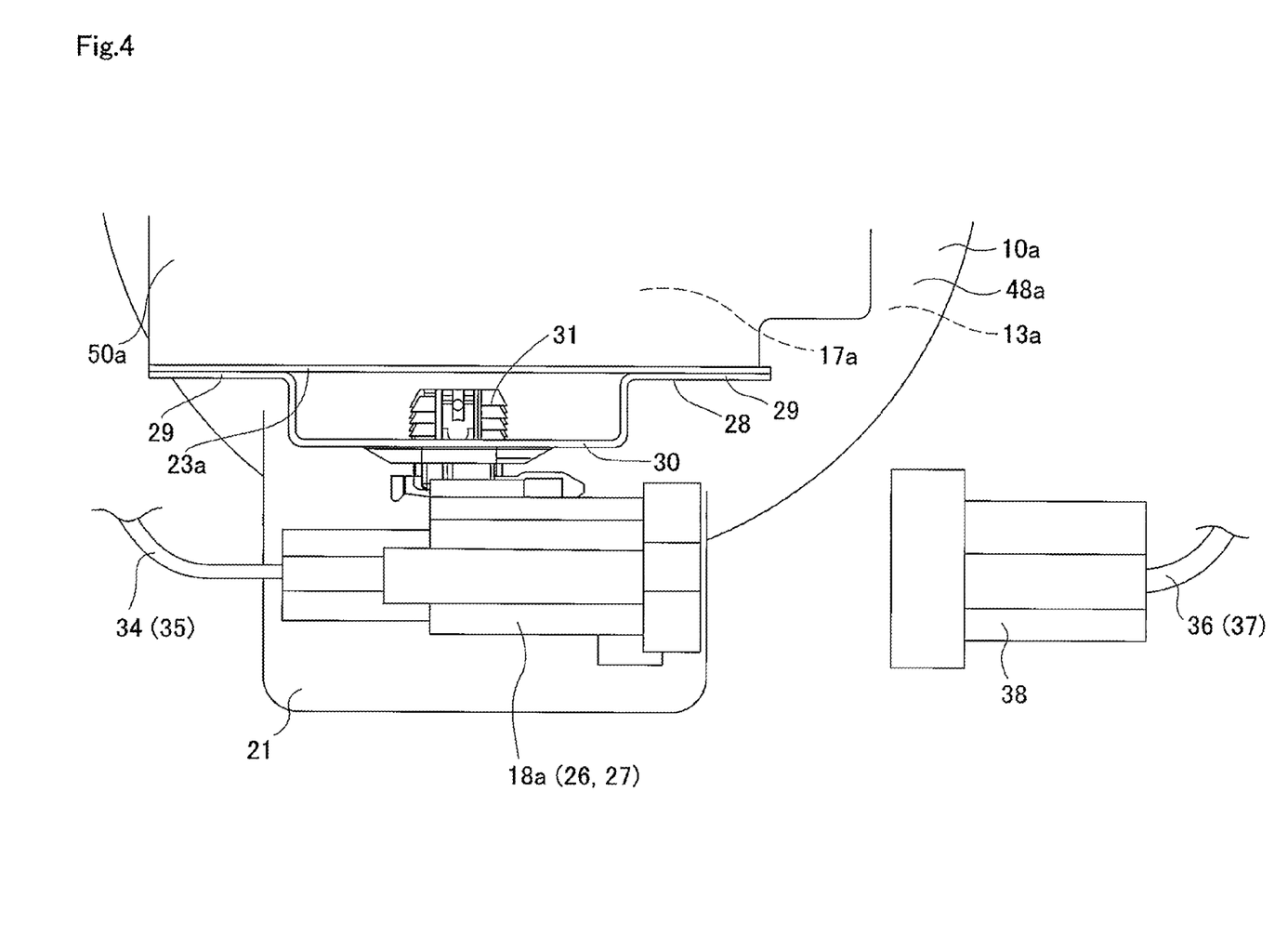
FIG. 4 is an enlarged view as seen from the right side in FIG. 1 (the rear side of the vehicle), and illustrates the state immediately before connecting the plug to the connector.

Furthermore, a flat shaped protective wall section 21 is formed so as to extend downward from the bottom surface of the worm wheel housing section 48a of the housing 10a. The edge on the bottom end (edge of the tip end) of this protective wall section 21 is made to protrude sufficiently downward further than the bottom end section of the connector 18a that is arranged as described above (located further away from the center axis of the steering column). Particularly, in this example, taking into consideration the installation position of this connector 18a, the position of the portion other than the protective wall section 21 that comes in contact with the flat plane α and the amount that protrudes downward (height dimension) thereof, the installation position of the protective wall section 21 and the downward protruding amount thereof are regulated so that the connector 18a is located in a portion separated from and above the flat plane α. As a result, in this example, the electric power-steering apparatus is presumed to be placed on the flat plane α before assembled in the vehicle, the edge on the bottom end of the protective wall section 21 and the corners 47 on bottom surface of the rear end section of the side plates sections 33 on both sides of the support bracket 32 for supporting the middle section of the steering column 1b by the vehicle come in contact with the flat plane α, and a gap 52 is formed between the flat plane α and the bottom end section of the connector 18a. Moreover, in this example, as illustrated in FIG. 2 and FIG. 4, the width dimension of the protective wall section 21 (dimension in the left-right direction in FIG. 2) is larger than the width dimension of the connector 18a. Furthermore, when the connector 18a is installed, the dimensions in the forward-backward direction of the connector 18a are regulated so that the connector 18a does not protrude toward the rear more than the circuit board housing section 50a.

Figure 5:
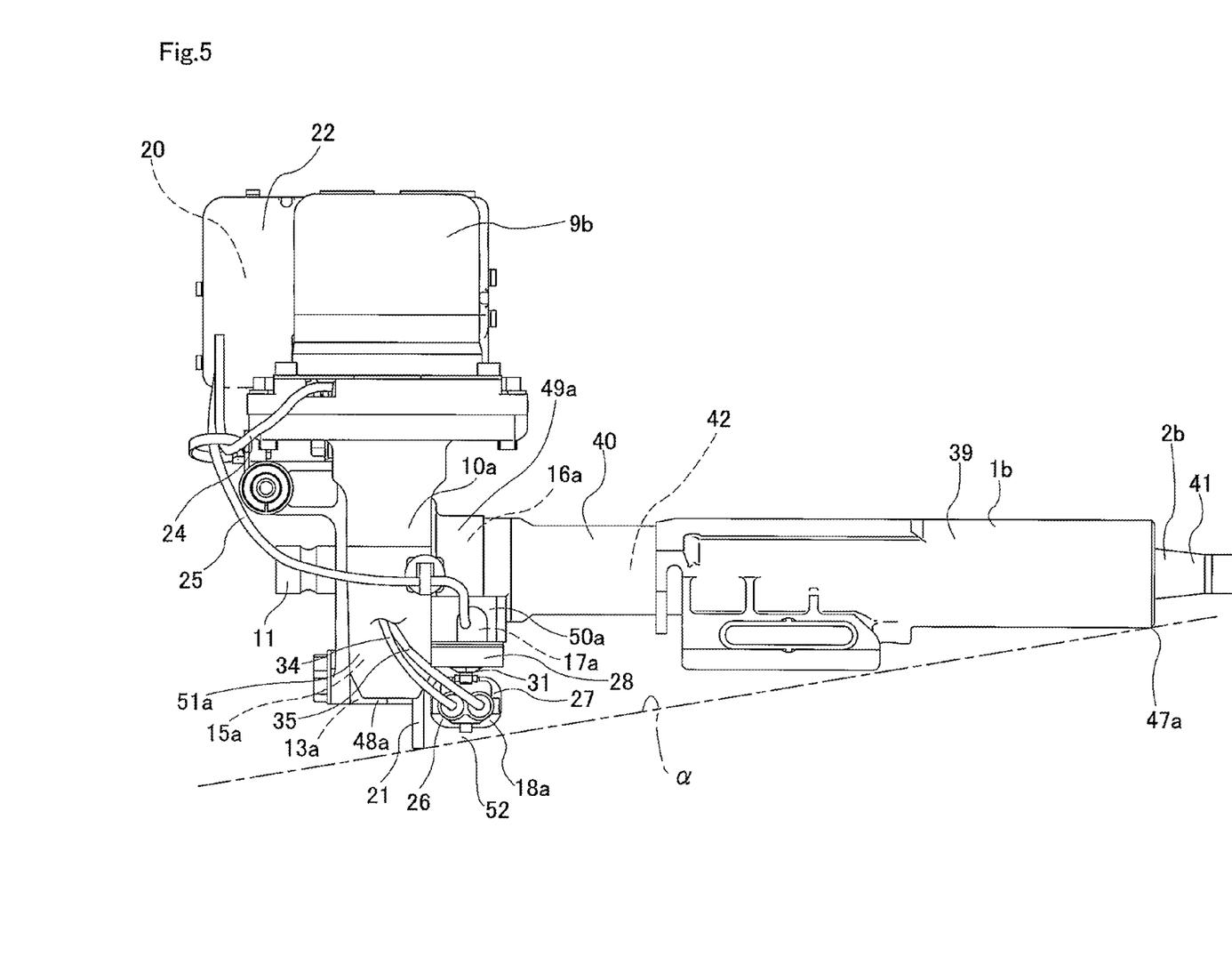
FIG. 5 is a side view illustrating the electric power-steering apparatus illustrated in FIG. 1 with a support bracket and support plate omitted.

As illustrated in FIG. 5, before the support bracket 32 is attached to the outer column 39 of the steering column 1b, the edge on the bottom end of the protective wall section 21 and the corner 47a on the bottom surface of the rear end section of the steering column 1b come in contact with the flat plane α, and in this state as well, the connector 18a does not come in contact with this flat plane α.

Furthermore, with the support bracket 32 installed, a total of three locations, namely the edge on the bottom end of the protective wall section 21 having a relatively large width dimension, and the corners 47 of the side plate sections 33 on both sides in the width dimension of the support bracket 32, come in contact with the flat plane α. Therefore, it becomes possible to support the electric power-steering apparatus at three points, which is advantageous from the aspect of stabilizing the position of the electric power-steering apparatus when temporarily put in place. However, when it is possible to made the width dimension of the edge on the bottom end of the protective wall section 21 relatively large as in this example, instead of having the corners 47 of the side plate sections 33 come in contact with the flat plane α, it is possible to have an installation protrusion that is separately formed on the bottom surface of the steering column 1b, or have an existing geometric protrusion come in contact with the flat plane α. On the other hand, when it is not possible to maintain the width the dimension of the edge of the bottom end of the protective wall section 21, preferably contact with the flat plane α will be made at a total of three locations, such as having the corners 47 of the side plate sections 33 on both sides come in contact.

A total of two cables, namely the power cable 34 for supplying power to the controller 20, and the signal cable 35 for exchanging communication signals with the controller 20, come out from the connector 18a that is arranged as described above. It is omitted in the figures, however, these cables 34, 35 enter into the case 22 where they are connected to the controller 20.

As illustrated in FIG. 4, in the case of this example, the power supply harness 36 that is connected to the battery, and the signal harness 37 that is connected to the in-vehicle network are connected to the connector 18a using one plug (combined plug) 38. An concave section is formed on the tip end surface of the plug 38 into which the tip end side half section of the connector 18a can be inserted, and by inserting the tip end side half section of the connector 18a into this concave section, the power supply harness 36 and the power cable 34, as well as the signal harness 37 and the signal cable 35 are electrically connected. In other words, in this state, power flows to the controller 20 and the battery, and also to the controller 20 and in-vehicle network, completing the work (insertion) of connecting the plug 38 into the connector 18a.

The electric power-steering apparatus of this example comprises a telescopic mechanism, a tilt mechanism and a collapsing mechanism for lessening the impact that occurs during a so-called secondary collision. These mechanisms will be briefly explained below. First, in order to construct the telescopic mechanism, the steering column 1b is constructed by combining an outer column 39 with an inner column 40 in a telescope shape so as to be able to extend and contract. Of these, the outer column 39 is supported by the support bracket 32 so as to be able to move in the forward-backward direction. The steering shaft 2b is constructed by combining an outer shaft 41 and an inner shaft 42 with a spline fit and the like so as to be able to transmit torque and to be able to extend and contract.

Next, in order to construct the tilt mechanism, the top section of the front end section of the worm wheel housing section 48a of the housing 10a is supported by a support plate 43 made of metal plate that is fastened to the vehicle body by a tilt shaft so that pivoting displacement is possible. Moreover, the outer column 39 is supported by the support bracket 32 so as to be move in the up-down direction.

Furthermore, in order to construct the mechanism for lessening impact on the driver during a secondary collision, the support bracket 32 is supported by a support plate 43 using a pair of support capsules 45 and bolts (not illustrated in the figure) so as to be able to break away in the forward direction. Therefore, when a secondary collision occurs in which the driver collides with the steering wheel 3 (see FIG. 10), by the outer column 39 displacing (stroke) in the forward direction with respect to the inner column 40, both support capsules 45 break away from the support bracket 32, and the support bracket 32 moves together with the outer column 39 toward the front side (housing 10a side) of the vehicle. However, in this case as well, in this example, the connector 18a is such that it does not protrude further toward the rear side than the circuit board housing section 50a, so the support bracket 32 is prevented from coming in contact with the connector 18a. Therefore, the installation of this connector 18a does not limit the amount of displacement in the forward direction of the steering wheel 3 during a secondary collision.

With the electric power-steering apparatus of this example, it is possible to both prevent damage to the connector 18a, and to improve workability when performing the work of connecting this connector 18a. In other words, in this example, when assembled in the vehicle, the connector 18a is located on the rear side of the bottom end section (end section on the outer diameter side) of the worm wheel housing section 48a and below the torque sensor housing sections 49. Therefore, for the worker who performs the connection work from the driver seat side, the connector 18a is exposed in a relatively large space (legroom) further on the near side than the housing 10a. Consequently, it becomes possible to easily perform the work of inserting the plug 38 into the connector 18a and connecting the power supply harness 36 and the signal harness 37. Particularly, in this example, it is possible to perform this work with one hand because this connecting work can be completed by inserting the plug 38 into the connector 18a, so it is possible to improve the workability of the work for connecting the connector 18a.

In addition, in this example, assuming that the bottom surface (the side where the connector 18a is located) of the steering column 1b when assembled in the vehicle is facing downward and that the electric power-steering apparatus is placed on the flat plane α, the installation position of the connector 18a and the installation position and protruding amount of the protective wall section 21 are regulated so that the edge on the bottom end of the protective wall section 21 and the corners 47 of the side plate sections 33 on both sides of the support bracket 32 come in contact with the flat plane α and so that a gap 52 is formed between the flat plane α and the connector 18a. Therefore, even when the electric power-steering apparatus is temporarily placed on a flat floor surface before being assembled in the vehicle, it is possible to prevent the connector 18a from coming in contact with the floor surface. Consequently, it is possible to effectively prevent the connector 18a from being damaged.

As a result, with the electric power-steering apparatus of this example, it is possible to both prevent damage to the connector 18a and to improve workability of the work for connecting the connector 18a. Moreover, in this example, a power cable 34 and signal cable 35 come out from the connector 18a in the width direction, so it is possible to prevent damage to these cables 34, 35 due to the end sections of these cables 34, 35 coming in contact with the floor surface. Furthermore, the amount of displacement in the forward direction of the steering wheel 3 during a secondary collision is not limited by the existence of the connector 18a.

EXAMPLE 2

Figure 6:
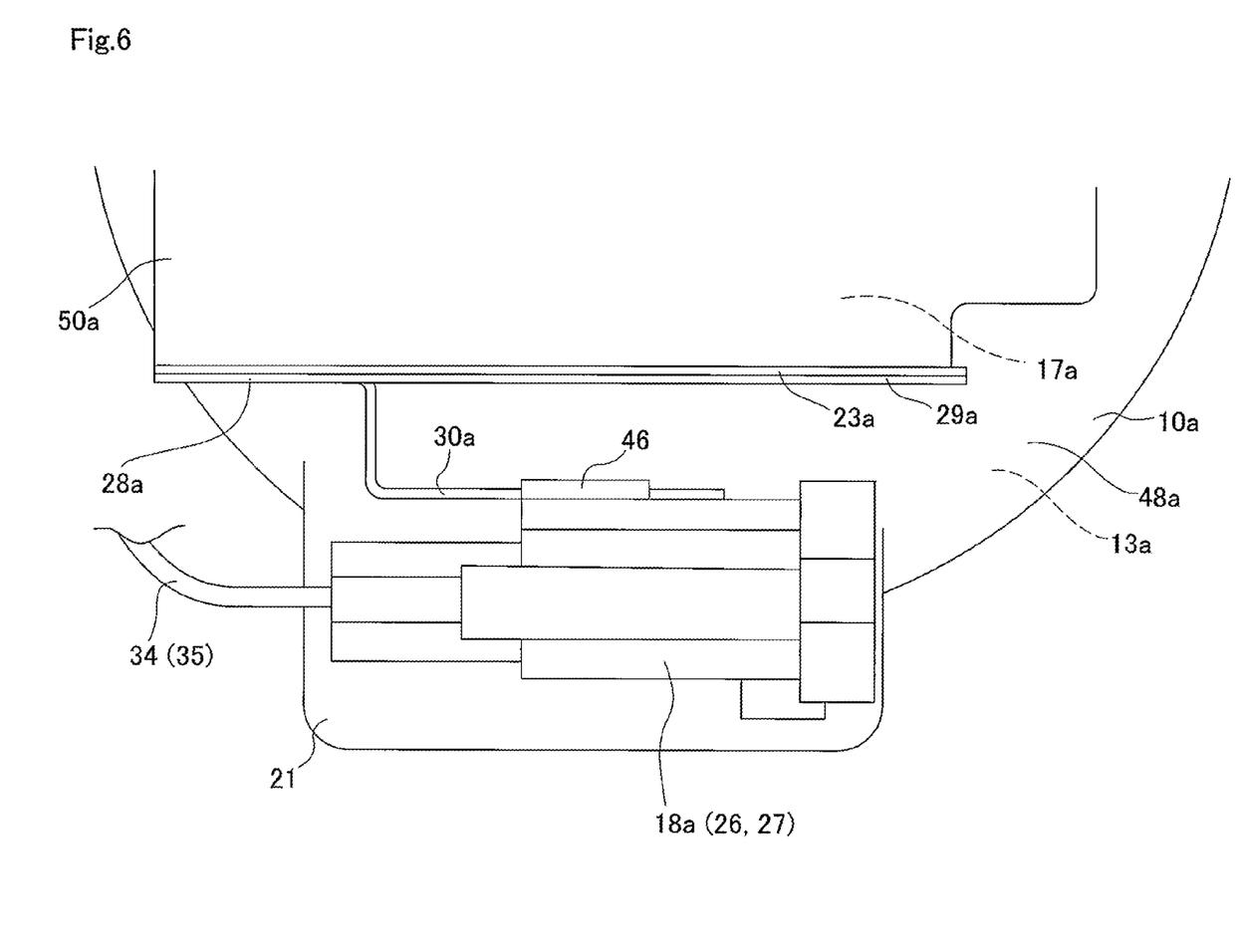
FIG. 6 is a drawing similar to FIG. 4, and illustrates an electric power-steering apparatus of a second example of an embodiment of the present invention.

FIG. 6 illustrates a second example of an embodiment of the present invention. In the case of this example, the structure of installing the connector 18a is different than in the first example of the embodiment. In other words, in this example, the installation plate 28a for fastening the connector 18a to the cover 23 that covers the bottom surface of the circuit board housing section 50a is composed of a connecting section 29a and a support section 30a that has an L shaped cross section. This support section 30a is pressure fitted into a locking hole or locking groove that is provided in a locking section 46 that is formed on the upper portion of the connector 18a, and the connector 18a is supported by the support section 30a so as to be suspended. In this example, the work of installing the connector 18a is simplified because there is no necessity of using the fastening member 31 that is used in the structure of the first example, and it is possible to reduce the number of parts and costs. The structure and functions of other parts are the same as in the first example.

EXAMPLE 3

Figure 7:
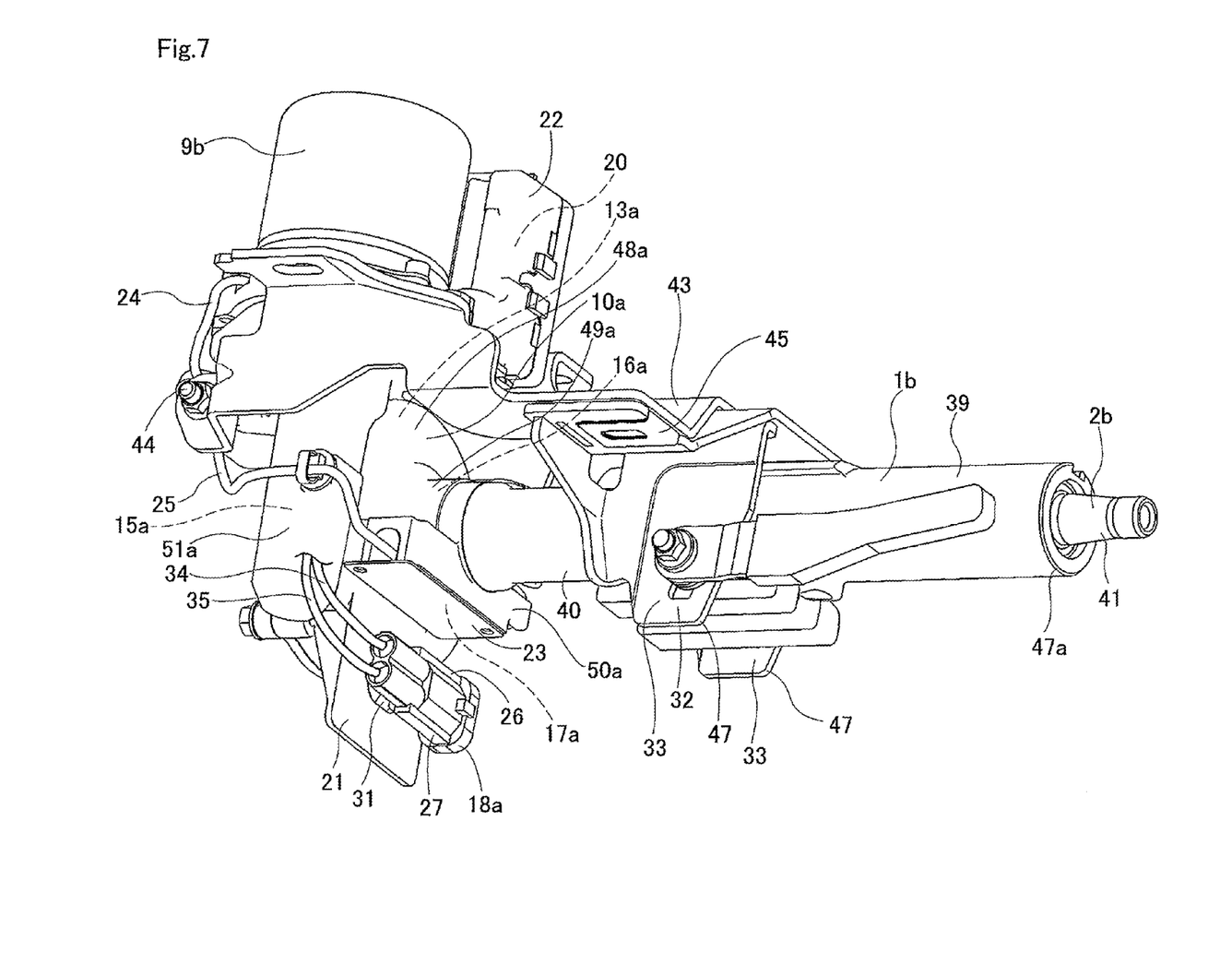
FIG. 7 is a perspective view illustrating an electric power-steering apparatus of a third example of an embodiment of the present invention.
Figure 8:
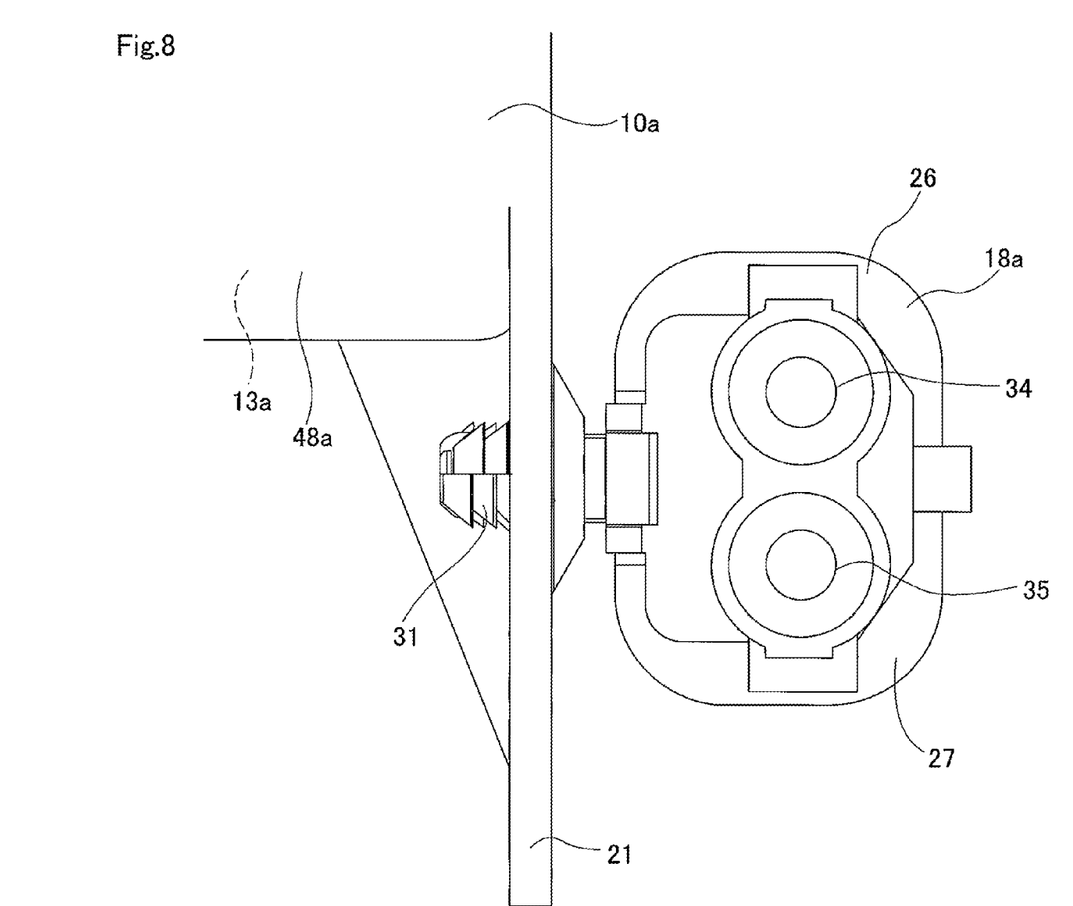
FIG. 8 is an enlarged view of the connector illustrated in FIG. 7 as seen from the plug insertion side.

FIG. 7 and FIG. 8 illustrate a third example of an embodiment of the present invention. In this example, the position for installing the connector 18a is different than in the first and second examples. In other words, in this example, the connector 18a is directly supported by and fastened to the middle section in the up-down direction of the surface on the rear side of the protective wall section 21. In this example having this kind of structure, it is possible to reduce the number of parts and reduce the accompanying costs by the amount of omitting the installation plates 28, 28a that were used in the first example and second example.

Moreover, in the example in the figures, the connector 18a is fastened with the power supply connector 26 and the signal connector 27 of the connector 18a arranged in the up-down direction, however it is also possible to arrange them in the forward-backward direction as in the first example and second example. On the other hand, in the structure of the first example and the second example, it is also possible to arrange the power supply connector 26 and the signal connector 27 in the up-down direction. By arranging the power supply connector 26 and the signal connector 27 in the up-down direction in this way, the connector 18a can be easily kept from protruding further toward the rear than the circuit board housing section 50a of the housing 10a. The structure and functions of other parts are the same as in the first example and the second example.

EXAMPLE 4

Figure 9:
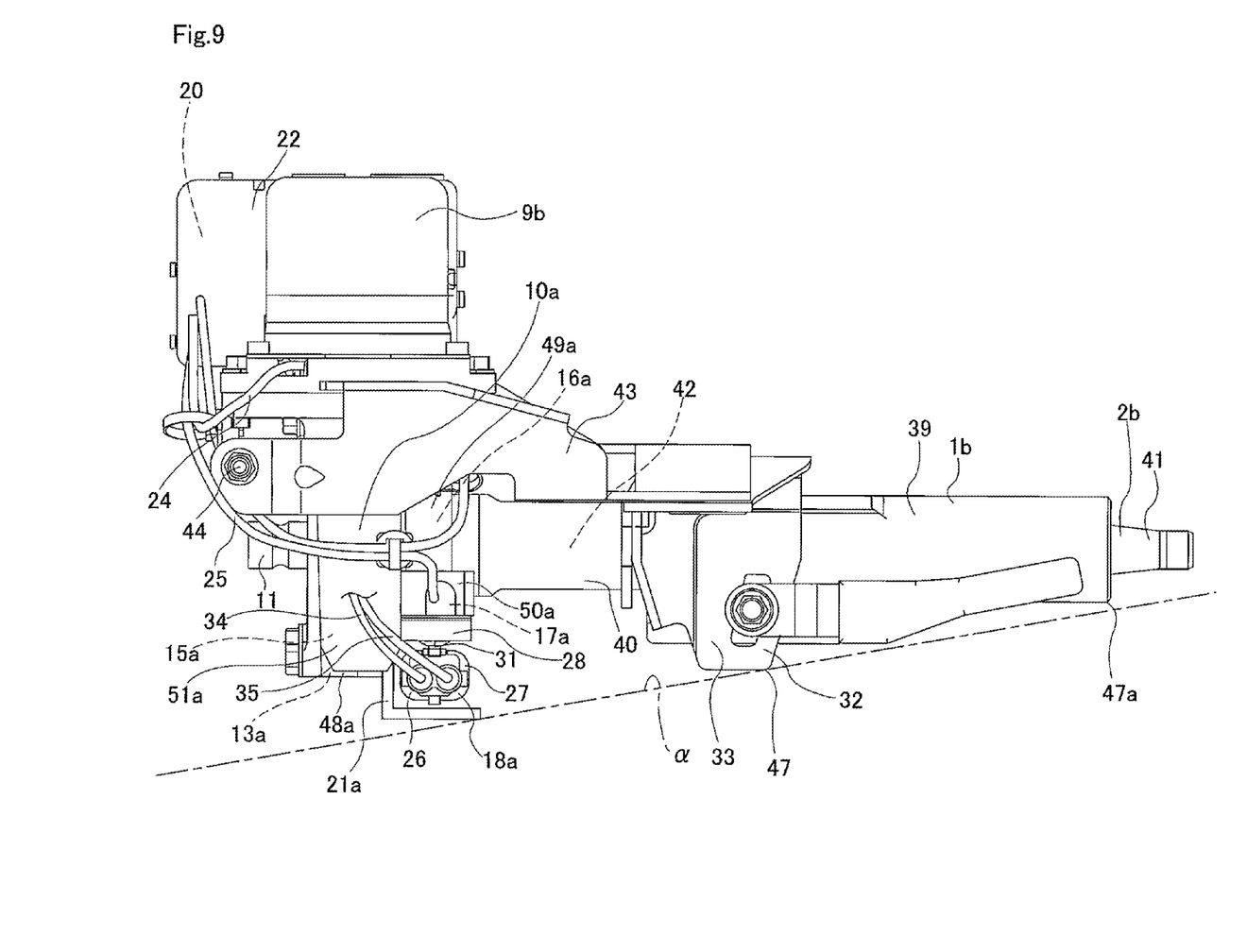
FIG. 9 is a side view illustrating an electric power-steering apparatus of a fourth example of an embodiment of the present invention.

FIG. 9 illustrates a fourth example of an embodiment of the present invention. In this example, the shape of the protective wall section 21a is different than in the first example through third example. In other words, in this example, by extending the protective wall section 21a toward the rear from the edge on the bottom end, the protective wall section 21a is formed so as to have an L-shaped cross section. With this kind of protective wall section 21a, a front side section and part or all of a bottom section of the connector 18a is covered. In the case of this example constructed as described above, it is possible to cover the bottom section of the connector 18a with the protective wall section 21a, so it is possible to effectively protect the bottom section of the connector 18a from being damaged due to being kicked by the driver or the like. The structure and functions of the other parts are the same as in the first through third example.

In any of the first example through fourth example, the case of devising the installation position (layout) of the connector 18a (power supply connector 26 and signal connector 27) used for supplying power to the controller 20 as the object was explained. However, in the case of embodying the present invention, the connector that is the object for devising the installation position is not limited to the connector 18a as described above. In other words, of the connectors used for supplying electric power to the controller 20, connectors other than the power supply connector 26 and the signal connector 27 can be used as the object, and connectors used for supplying electric power to electrical components (electric motor, torque sensor, rotation speed sensor and the like) other than the controller 20 can be used as the target. Furthermore, it is also possible to have three or more integrated connectors as the object. Moreover, the connector is not limited to being below the housing, and could also be placed below the steering column (further toward the rear than the portion where the housing is provided). The protective section (protective wall section) is also not limited to being on the bottom surface of the housing, and could be directly formed on the bottom surface of the steering column.

[Explanation of Reference Numbers]
1, 1a, 1b Steering column
2, 2a, 2b Steering shaft
3 Steering wheel
4a, 4b Universal joint
5 Intermediate shaft
6 Steering gear unit
7 Input shaft
8 Tie rod
9, 9a, 9b Electric motor
10, 10a Housing
11 Transmission shaft
12 Torsion bar
13, 13a Worm wheel
14 Output shaft
15, 15a Worm
16, 16a Torque sensor
17, 17a Circuit board
18, 18a Connector
19 Harness
20 Controller (ECU)
21, 21a Protective wall section
22 Case
23 Cover
24 Motor harness
25 Sensor harness
26 Power supply connector
27 Signal connector
28, 28a Installation plate
29, 29a Connecting section
30, 30a Support section
31 Fastening member
32 Support bracket
33 Side plate section
34 Power cable
35 Signal cable
36 Power supply harness
37 Signal harness
38 Plug
39 Outer column
40 Inner column
41 Outer shaft
42 Inner shaft
43 Support plate
44 Tilt shaft
45 Capsule
46 Locking section
47, 47a Corner
48, 48a Worm wheel housing section
49, 49a Torque sensor housing section
50, 50a Circuit board housing section
51, 51a Worm housing section
52 Gap

What is claimed is:

1. An electric power-steering apparatus, comprising:
a cylindrical steering column that is supported by a vehicle body;
a steering shaft that is supported on the inside of the steering column so as to be able to rotate freely, and that is rotated by a steering wheel that is fastened to the rear end section thereof;
an electrical component that is used for applying auxiliary power in the same direction as the force applied from the steering wheel to the steering shaft or to a member that displaces as the steering shaft rotates;
a connector for supplying electric power to the electrical component; and
a housing that is fastened to the front end section of the steering column and comprises; a worm wheel housing section that has an approximate circular disk shape, that is arranged so as to be concentric with the steering column, and that houses a worm wheel inside thereof; and a torque sensor housing section that is provided adjacent to the rear side of the worm wheel housing section, that has a smaller diameter than the worm wheel housing section and that houses a torque sensor inside thereof,
wherein a substantially flat shaped protective wall section is provided on a bottom surface of the steering column or a bottom surface of the worm wheel housing section and extends downward when assembled in the vehicle, and assuming that the electric power-steering apparatus is placed on a flat plane, a bottom end section of the protective wall section comes in contact with the flat plane, and
the connector is installed in a portion that is located below the steering column or the torque sensor housing section when assembled in the vehicle, and that is above and separated from the flat plane assuming that the electric power-steering apparatus is placed on the flat plane with the bottom surface of the steering column facing downward when assembled in the vehicle.

2. The electric power-steering apparatus according to claim 1, wherein the width dimension of the protective wall section is greater than the width dimension of the connector.

3. The electric power-steering apparatus according to claim 1, wherein the protective wall section further comprises an additional flat wall portion that is attached with the flat shaped protective wall section to form an approximate L-shaped cross section structure, and this L-shaped cross section structure covers a side section and part or all of a bottom section of the connector.

4. The electric power-steering apparatus according to claim 1, wherein the connector is a power supply connector for supplying electric power to an electric motor of the electric component, or is a combined connector that includes the power supply connector.

\* \* \* \* \*